(12) United States Patent
Scott

(10) Patent No.: US 8,798,541 B1
(45) Date of Patent: Aug. 5, 2014

(54) SYSTEM AND METHOD FOR SOCKET BACKED HOST CONTROLLER INTERFACE EMULATION FOR VIRTUAL BLUETOOTH ADAPTER

(75) Inventor: Micah Elizabeth Scott, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 389 days.

(21) Appl. No.: 13/084,327

(22) Filed: Apr. 11, 2011

(51) Int. Cl.
*H04B 7/00* (2006.01)

(52) U.S. Cl.
USPC .......................... 455/41.2; 455/500; 455/66.1

(58) Field of Classification Search
USPC ....................... 455/41.2, 41.3, 500, 507, 66.1
See application file for complete search history.

(56) References Cited

U.S. PATENT DOCUMENTS

| | | | | |
|---|---|---|---|---|
| 8,327,353 | B2 * | 12/2012 | Traut | 718/1 |
| 8,433,801 | B1 * | 4/2013 | Yemini et al. | 709/226 |
| 2002/0012329 | A1 * | 1/2002 | Atkinson et al. | 370/330 |
| 2009/0144510 | A1 * | 6/2009 | Wibling et al. | 711/147 |
| 2009/0204964 | A1 * | 8/2009 | Foley et al. | 718/1 |
| 2010/0197326 | A1 * | 8/2010 | Ngo | 455/466 |
| 2010/0284380 | A1 * | 11/2010 | Banerjee et al. | 370/338 |
| 2010/0325644 | A1 * | 12/2010 | van der Linden et al. | 719/327 |
| 2011/0093902 | A1 * | 4/2011 | De Los Reyes et al. | 725/80 |
| 2011/0145418 | A1 * | 6/2011 | Pratt et al. | 709/227 |
| 2011/0286380 | A1 * | 11/2011 | Zhu | 370/315 |
| 2012/0203877 | A1 * | 8/2012 | Bartholomay et al. | 709/221 |

\* cited by examiner

*Primary Examiner* — Andrew Wendell

(57) ABSTRACT

A Bluetooth adapter is shared among guest operating systems of different virtual machines running on a common host computer system using a Bluetooth virtualization stack. The Bluetooth virtualization stack is exposed as a Bluetooth adapter to a guest operating system and as a Bluetooth application to a host operating system. The Bluetooth virtualization stack parses individual socket streams associated with an asynchronous connectionless link (ACL) originating from the guest operating system and couples the socket streams to an application interface associated within the host operating system. Plural instances of the guest operating system and corresponding Bluetooth virtualization stack collectively present a set of socket connections to the host operating system. A Bluetooth driver within the host operating system multiplexes the set of socket streams, advantageously sharing the Bluetooth adapter among different instances of the guest operating system.

20 Claims, 7 Drawing Sheets

SYSTEM AND METHOD FOR SOCKET BACKED HOST CONTROLLER INTERFACE EMULATION FOR VIRTUAL BLUETOOTH ADAPTER

BACKGROUND

Virtual machine (VM) systems provide a guest operating system (OS) with a virtual execution platform comprising virtual hardware subsystems configured to emulate corresponding physical hardware subsystems. In some virtualized systems, the virtual hardware subsystems are substantially indistinguishable to the guest OS from corresponding physical hardware subsystems. For example, the guest OS executes on a virtual central processing unit (CPU) that function as a physical CPU, but can be thought of as a virtualized representation of a physical CPU. Each of potentially many VMs may execute on a corresponding instance of a virtual CPU that are isolated from one another, while transparently sharing a common underlying physical CPU. A host OS typically manages physical hardware resources that provide underlying functionality for the virtual hardware subsystems used by VMs. Certain virtual hardware subsystems, such as a virtual CPU, share access to a corresponding physical hardware resource. Other virtual hardware subsystems, such as universal serial bus (USB) storage devices are conventionally connected to a specific VM for exclusive access.

In the art of wireless communications, Bluetooth® refers to a specific systems architecture having a physical wireless link layer, a link-based communications protocol, and an interface specification. A device that implements the Bluetooth system architecture is referred to as a Bluetooth device. For example, a cell phone earpiece configured to communicate via Bluetooth is a Bluetooth device. A Bluetooth device that is configured to provide wireless connectivity to a host system is referred to in the art as a Bluetooth adapter. The link-based protocol specifies an asynchronous connectionless link (ACL) as a basic data channel that may be established between any two Bluetooth devices. All data transmitted between the two Bluetooth devices is transmitted via one ACL linking the two devices. Only one ACL may be established between any two Bluetooth devices.

When a Bluetooth adapter is attached to a physical host system executing one or more VMs, the Bluetooth adapter is conventionally used by a guest OS associated with one of the VMs. This guest OS is given exclusive access to the Bluetooth adapter via a pass-through connection to the Bluetooth adapter. In such a scenario, no other guest OS may connect to the Bluetooth adapter without potentially interfering with the guest OS connected to the Bluetooth adapter. For example, if one guest OS establishes an ACL with an external Bluetooth device, and a second guest OS attempts to establish a second ACL with the same external Bluetooth device, then an error will occur because Bluetooth specifically prohibits establishing more than one ACL between two Bluetooth devices. In usage models requiring plural guest OS instances executing on a particular host to each have Bluetooth connectivity, a physically different Bluetooth adapter is required to be coupled to the host for each guest OS instance. Such redundant hardware is expensive and inefficient.

SUMMARY

One or more embodiments of the present invention provide a technique for sharing a Bluetooth adapter among guest operating systems of different virtual machines running on a common host computer system using a Bluetooth virtualization stack. The Bluetooth virtualization stack is exposed as a Bluetooth adapter to a guest operating system and as a Bluetooth application to a host operating system. The Bluetooth virtualization stack parses individual socket streams associated with an asynchronous connectionless link (ACL) originating from the guest operating system and couples the socket streams to an application interface associated within the host operating system. Plural instances of the guest operating system and corresponding Bluetooth virtualization stack collectively present a set of socket connections to the host operating system. A Bluetooth driver within the host operating system multiplexes the set of socket streams, advantageously sharing the Bluetooth adapter among different instances of the guest operating system.

A system, according to an embodiment of the present invention, includes a plurality of guest virtual machines (VMs) executing on a physical computer system, each VM implementing a wireless protocol stack configured to establish a data link for transmitting and receiving data packets with a virtual peer device, and virtualization software running on the physical computer system having a wireless virtualization stack corresponding to each VM, each wireless virtualization stack configured as the virtual peer device for the corresponding VM.

A method for sharing a wireless communications adapter between virtual machines running on a common host platform, according to an embodiment of the present invention includes the steps of receiving data packets from a first virtual machine and unbundling payload data from the received data packets, receiving data packets from a second virtual machine and unbundling payload data from the received data packets, and transmitting the unbundled payload data to the wireless communication adapter. The method may further include the steps of receiving unbundled payload data from the wireless communication adapter, bundling a first portion of the unbundled payload data to generate data packets and transmitting the data packets to a first virtual machine, and bundling a second portion of the unbundled payload data to generate data packets and transmitting the data packets to a second virtual machine.

Further embodiments of the present invention include, without limitation, a non-transitory computer-readable storage medium that includes instructions that enable a processing unit to implement one or more aspects of the above methods as well as a computer system configured to implement one or more aspects of the above methods.

DETAILED DESCRIPTION

A. Virtualization Platform Architecture

Figure 1A:
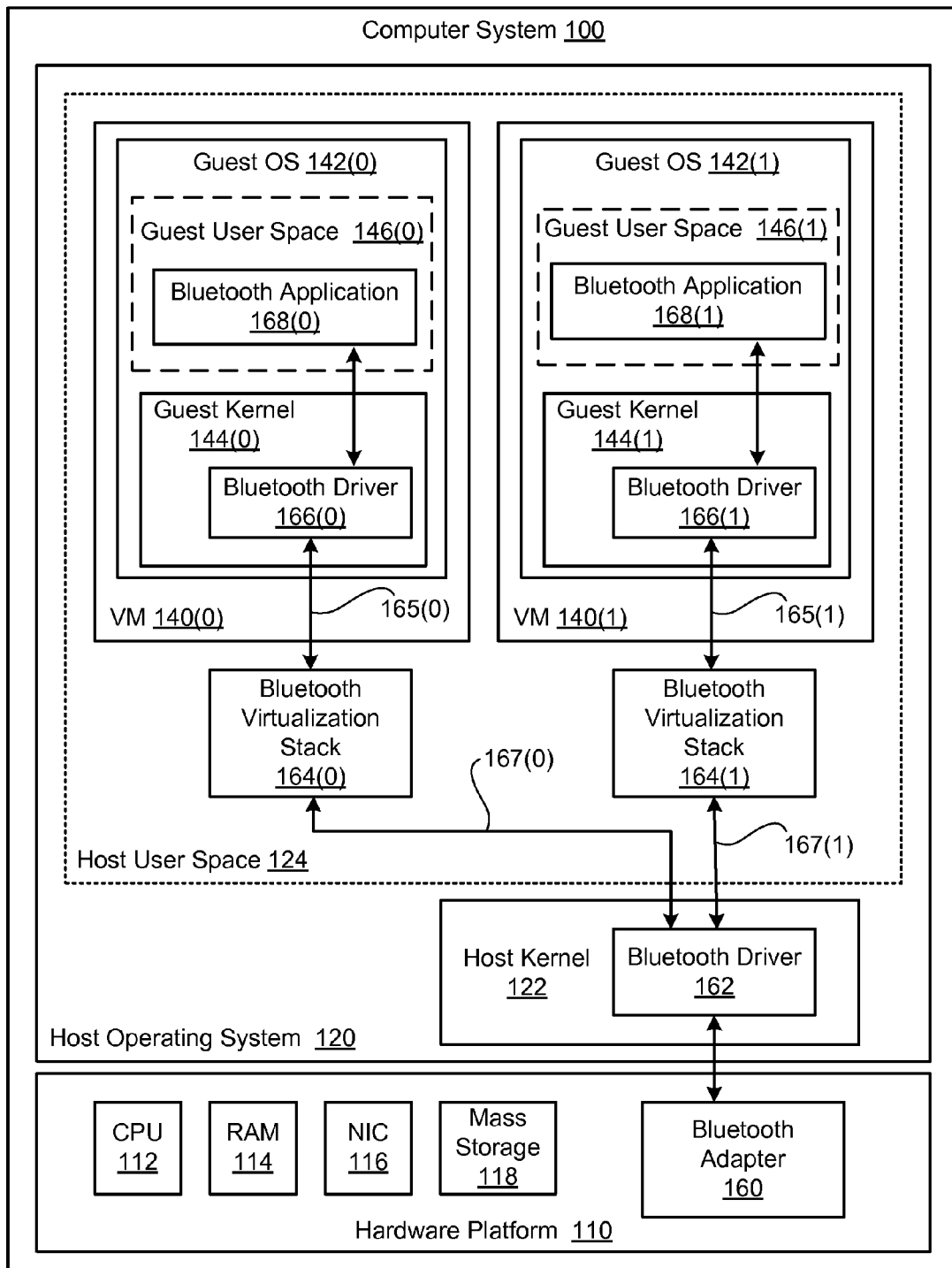
FIG. 1A shows a block diagram of a computer system configured to implement one or more aspects of the present invention.

FIG. 1A shows a computer system 100 configured to implement one or more aspects of the present invention. The computer system 100 comprises a hardware computing platform 110, such as a desktop computer, laptop computer, tablet computer, mobile device such as a smart phone, server grade computer system, or any other hardware computing platform, including systems based on different variations of the well-known ARM or x86 architecture platforms. Such a hardware platform 110 may include a central processing unit (CPU) 112, random access memory (RAM) 114, Network Interface Card (NIC) 116, mass storage (such as a hard disk drive) 118 and other I/O devices such as a mouse and keyboard (not shown). The hardware platform 110 also includes a Bluetooth adapter 160, configured to provide wireless network connectivity to other Bluetooth devices (not shown).

In one embodiment, a host operating system 120 is installed on hardware platform 110. The host operating system (OS) 120 includes a host kernel 122, configured to manage resources within the hardware platform 110. The host kernel 122 includes a Bluetooth driver 162, configured to implement a Bluetooth protocol and management stack for operating the Bluetooth adapter 160. The host OS 120 provides a host user space 124, configured to provide certain process, memory, and resource abstractions. In one embodiment, one or more virtual machines (VMs) 140 are configured to execute as processes within user space 124. In certain embodiments, a virtualization layer provides virtualized resources to the VMs 140, such as a virtual CPU, virtual RAM, virtual NIC, and virtual mass storage, corresponding to physical resources. It should be recognized that the various terms, layers and categorizations used to describe the virtualization components in FIG. 1 may be referred to differently without departing from their functionality or the spirit or scope of the invention.

A guest OS 142 is configured to execute within each of the VMs 140. The guest OS 142 comprises a guest kernel 144 and provides a guest user space 146. The guest kernel 144 includes a Bluetooth driver 166 configured to accept requests from a Bluetooth application 168 executing within the guest user space 146 and to manage a Bluetooth adapter via an emulated universal serial bus (USB) connection 165. In alternative embodiments, different physical link configurations other than USB may be implemented. The emulated USB connection 165 is coupled to a Bluetooth virtualization stack 164, configured to emulate a USB Bluetooth adapter. The Bluetooth virtualization stack 164 is also configured to parse socket payload data from the emulated USB connection 165 and to remap the payload data to corresponding sockets 167, which are opened to the Bluetooth driver 162 and target the Bluetooth adapter 160 for communication to external Bluetooth devices. The Bluetooth driver 162 executes within the host kernel 122 and manages connections to the Bluetooth adapter 160. The Bluetooth driver 162 establishes one asynchronous connection link (ACL) to each external Bluetooth device via the Bluetooth adapter 160. All sockets 167 connected from any instances of the Bluetooth virtualization stack 164 targeting the same external Bluetooth device are transmitted via the same ACL to the external Bluetooth device.

Figure 1B:
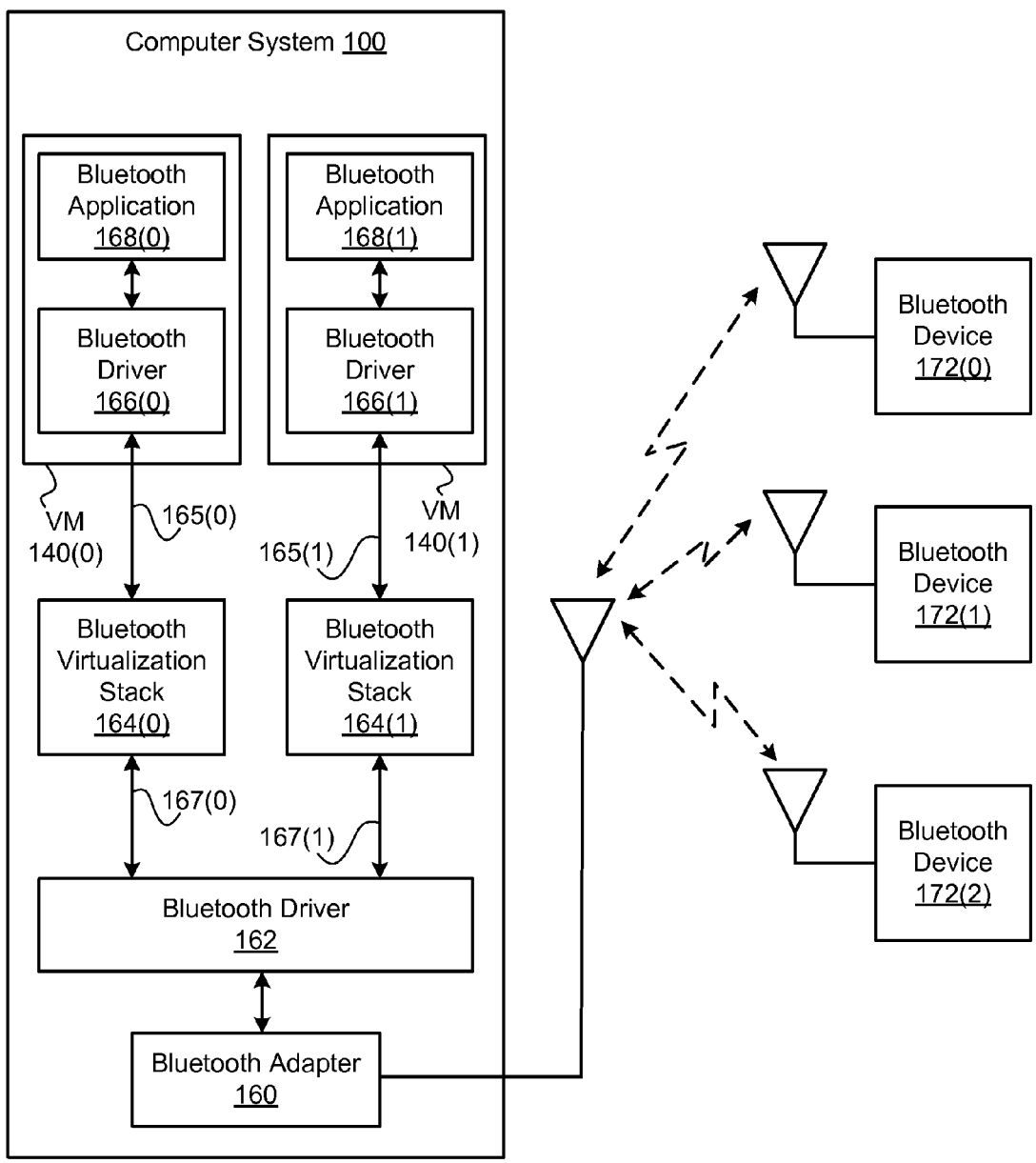
FIG. 1B illustrates Bluetooth applications connecting to different Bluetooth devices, according to one embodiment of the present invention.

FIG. 1B illustrates Bluetooth applications 168 connecting to different Bluetooth devices 172, according to one embodiment of the present invention. Bluetooth application 168(0) conventionally connects to Bluetooth driver 166(0), which further connects to Bluetooth virtualization stack 164(0) via emulated USB connection 165. The Bluetooth virtualization stack 164(0) appears to be a Bluetooth adapter to the Bluetooth driver 166(0). The Bluetooth virtualization stack 164(0) also appears to be a Bluetooth application to the Bluetooth driver 162. From the perspective of the Bluetooth driver 162, sockets 167 originating from instances of the Bluetooth virtualization stack 164 appear to be originating from Bluetooth applications. In one embodiment, the Bluetooth driver 162 conventionally provides shared access to the Bluetooth adapter 160 for the sockets 167. Bluetooth application 168(0) is able to communicate with any Bluetooth device 172 via the Bluetooth virtualization stack 164(0). Similarly, Bluetooth application 168(1) is able to communicate with any Bluetooth device 172 via Bluetooth virtualization stack 164(1). Importantly, only one ACL needs to be established between the Bluetooth adapter 160 and a given Bluetooth device 172, even though each Bluetooth driver 166 has what appears to be a private ACL to the same Bluetooth device 172.

B. Bluetooth Virtualization Stack

Figure 2A:
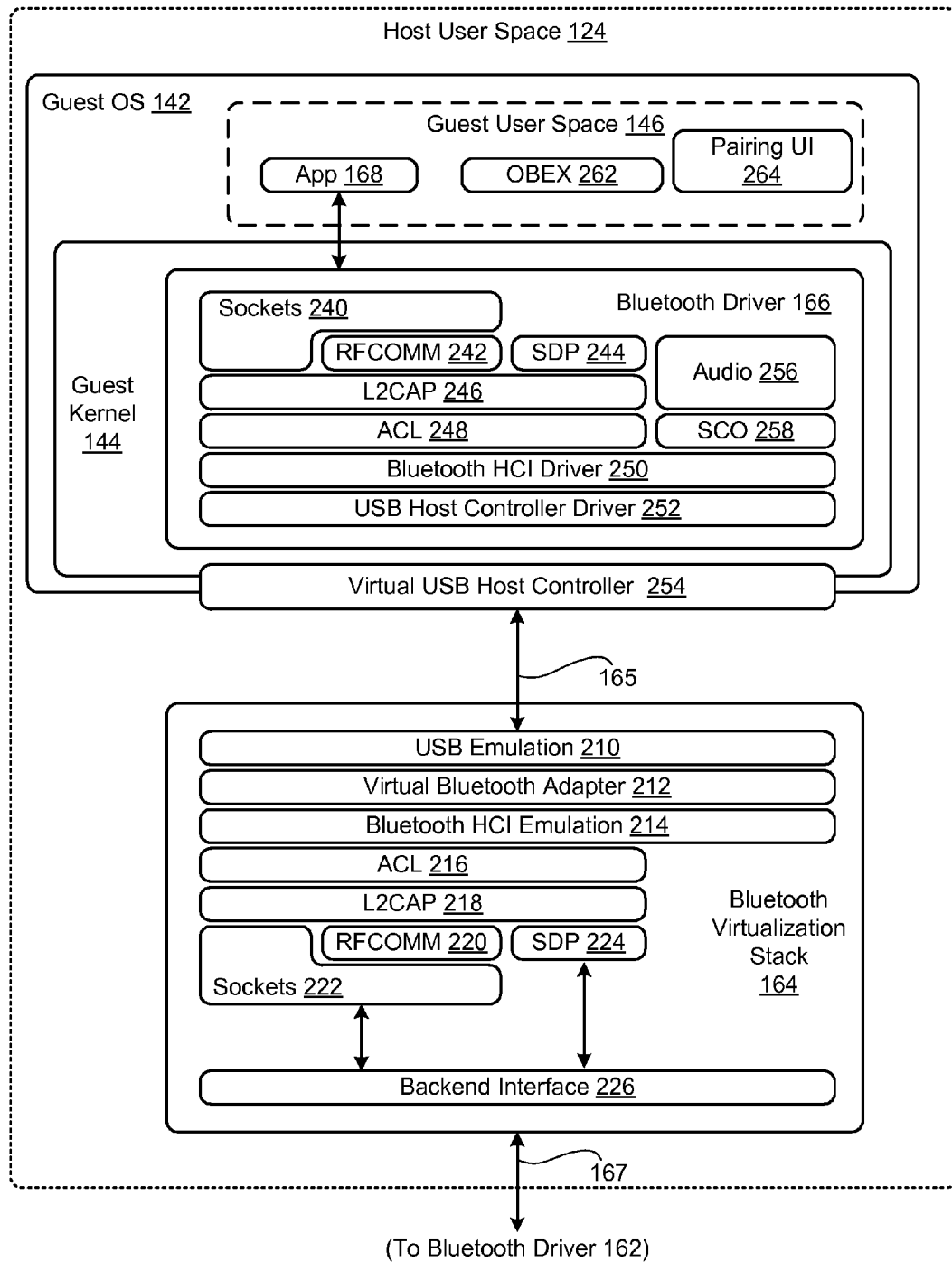
FIG. 2A is a diagram of functional modules within a Bluetooth driver and Bluetooth virtualization stack, according to one embodiment of the present invention.

FIG. 2A is a diagram of functional modules within the Bluetooth driver 166 and the Bluetooth virtualization stack 164, according to one embodiment of the present invention. As shown, the host user space 124 of FIG. 1 includes, without limitation, Guest OS 142 and Bluetooth virtualization stack 164. The guest OS 142 includes, without limitation, a guest user space 146, and a guest kernel 144.

The Bluetooth application 168, an object exchange protocol module (OBEX) 262, and a pairing user interface (UI) 264 execute within the guest user space 146. The Bluetooth application 168 may implement any technically feasible function or set of functions involving Bluetooth connectivity. The OBEX 262 is a communications protocol that facilitates exchanging objects, such as binary objects between Bluetooth devices. For example OBEX 262 may be used to push an object such as an image, contact entry, or printed page from the Bluetooth application 168 to an external Bluetooth device. In one embodiment, the OBEX 262 is implemented in guest user space 146, as shown. In an alternative embodiment, the OBEX 262 is implemented within the Bluetooth driver 166. A pairing UI 264 provides device pairing, whereby a Bluetooth device is authenticated for use. Although a Bluetooth device 172 may ultimately be accessed by Bluetooth application 168, pairing in this case is actually completed by the Bluetooth virtualization stack 164, which may be configured to authenticate any arbitrary pairing requests.

The Bluetooth driver 166 comprises a sockets interface 240, a serial connection emulation protocol module RFCOMM 242, a service discovery protocol module 244, a logical link controller and adaptation protocol (L2CAP) module 246, an asynchronous connectionless link (ACL) module 248, a Bluetooth host control interface (HCI) module 250, a USB host controller driver 252, a synchronous connection oriented (SCO) module 258, and an audio services module 256. The functions of each of these modules are well known in the field and need not be described in detail here. A virtual USB host controller 254 is a virtual hardware resource configured to emulate a host USB controller.

The Bluetooth virtualization stack 164 comprises a USB device emulation module 210, a virtual Bluetooth adapter 212, a Bluetooth HCI emulation module 214, an ACL emulation module 216, an L2CAP emulation module 218, an RFCOMM emulation module 220, an SDP emulation module 224, a socket services emulation module 222, and a backend interface module 226. The USB device emulation module 210 is coupled to the virtual USB host controller 254 and emulates a USB device. The virtual Bluetooth adapter 212 and Bluetooth HCI emulation module 214 are configured to emulate a physical Bluetooth adapter from a host perspective, as seen via emulated USB connection 165. The ACL emulation module 216, the L2CAP emulation module 218, RFCOMM emulation module 220, SDP emulation module 224, and socket services emulation module 210 operate in concert to unbundle data streams into separate, corresponding data streams. In certain cases, unbundled commands may be ignored, such as certain adapter hardware management commands. Each separate data stream may be coupled to backend interface 226 as a different socket connection within the socket connections 167. The socket connections 167 include different socket connections established by Bluetooth driver 162 and targeting Bluetooth devices 172. By splitting out socket connections from each ACL bundled together by a Bluetooth driver 166 and re-bundling the socket connections to form one ACL for each one of the Bluetooth devices 172, different VMs 140 may share the Bluetooth adapter 160. Accordingly, Bluetooth virtualization stack 164 acts as a virtual data link peer for socket connections established by one or more Bluetooth applications 168 and establishes corresponding socket connections to Bluetooth devices 172 via Bluetooth driver 162.

Figure 2B:
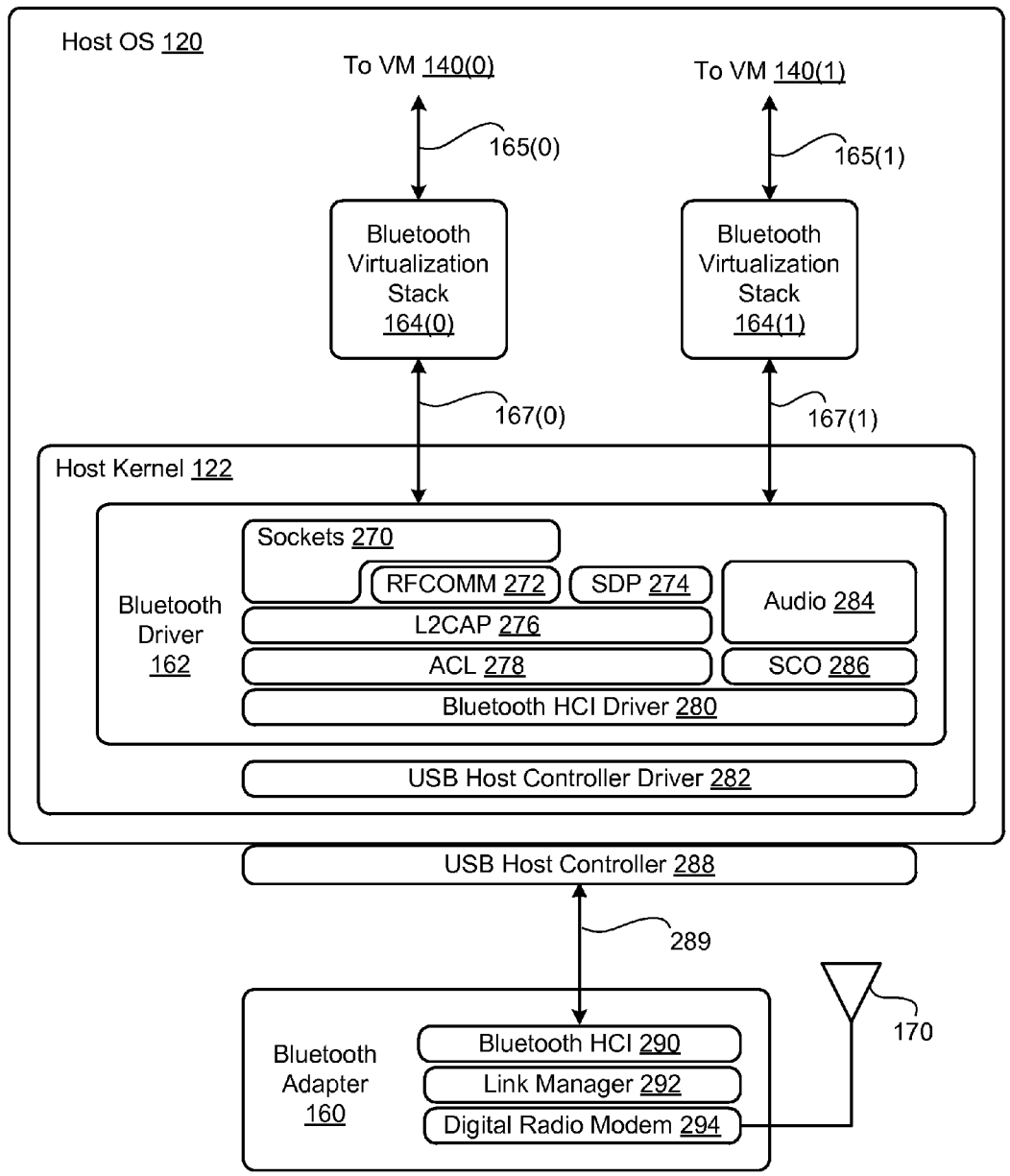
FIG. 2B is a diagram of functional modules within a Bluetooth driver and Bluetooth adapter, according to one embodiment of the present invention.

FIG. 2B is a diagram of functional modules within the Bluetooth driver 162 and Bluetooth adapter 160, according to one embodiment of the present invention. The host OS 120 includes Bluetooth virtualization stacks 164, and Bluetooth driver 162 residing within the host kernel 122. The Bluetooth driver 162 comprises conventionally known modules, including a sockets services module 270, RFCOMM module 272, SDP module 274, L2CAP module 276, ACL module 278, audio services module 284, SCO module 286, Bluetooth HCI driver 280. Each of these modules is known in the art and may be conventionally organized to form the Bluetooth driver 162. A USB host controller driver 282 is configured to couple the Bluetooth HCI driver 280 to the Bluetooth adapter 160 via a USB host controller 288.

The Bluetooth adapter 160 comprises a Bluetooth HCI 290, a link manager 292, a digital radio modem 294, and an antenna 170. The Bluetooth HCI 290 is coupled to the USB host controller 288 and configured to receive data from and transmit data to the USB host controller 288. The Bluetooth HCI 290 provides a command interface to the link manager 292 and access to hardware status and control registers (not shown). The link manager 292 maintains link state with Bluetooth devices 172. The digital radio modem 294 and antenna 170 provide wireless connectivity to other Bluetooth devices 172. Persons skilled in the art will recognize that any Bluetooth adapter 160 or Bluetooth drivers 162, 166 may be implemented without departing the scope and spirit of the present invention.

Figure 3:
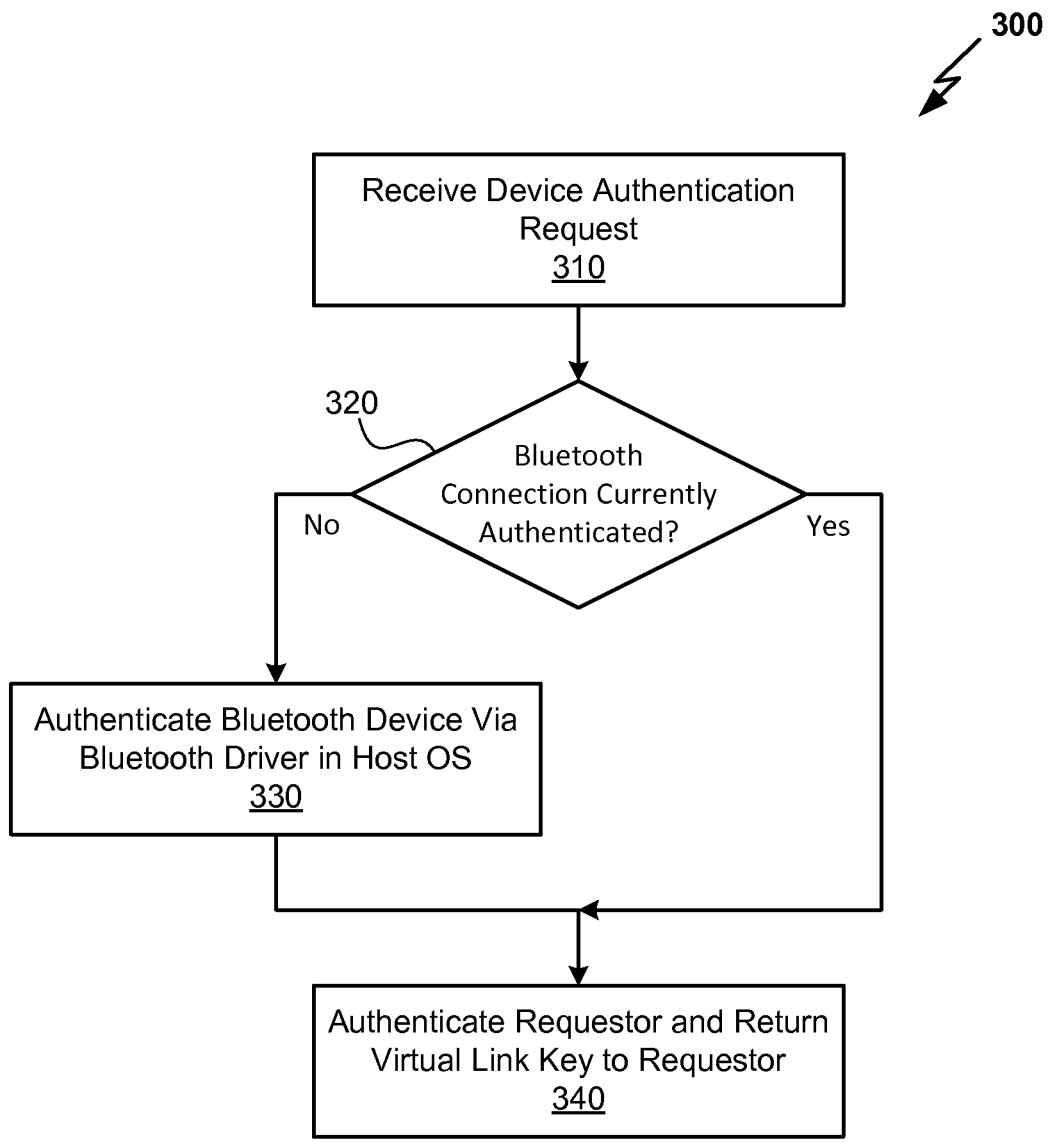
FIG. 3 is a flow diagram of method steps, performed by the Bluetooth virtualization stack, for emulating Bluetooth device authentication, according to one embodiment of the present invention.

FIG. 3 is a flow diagram of method steps 300, performed by the Bluetooth virtualization stack 164, for emulating Bluetooth device authentication, according to one embodiment of the present invention. Although the method steps are described in conjunction with the system of FIGS. 1-2B, it should be understood that there are other systems in which the method steps may be carried out without departing the scope and spirit of the present invention.

The method begins in step 310, where the Bluetooth virtualization stack 164 receives a device authentication request from a requestor, such as Bluetooth application 168. The authentication request may be for any Bluetooth device 172. In step 320, a connection to the Bluetooth device 172 is currently authenticated with respect to the Bluetooth driver 162 within the host operating system 120, then the method proceeds to step 340, where the Bluetooth virtualization stack 164 returns authentication credentials, such as a virtual link key, to the requestor. The virtual link key is a link key for communication between the Bluetooth driver 166 within the guest kernel 144 and the Bluetooth virtualization stack 164.

Returning to step 320, if a connection to the Bluetooth device 172 is not currently authenticated with respect to Bluetooth driver 162, then the method proceeds to step 330, where the Bluetooth driver 162 initiates an authentication process for the requested Bluetooth device 172. Any technically feasible authentication process may be followed to generate a link key for the Bluetooth device 172. The Bluetooth driver 162 may store the link key for future retrieval to facilitate communication with the Bluetooth device 172.

Figure 4:
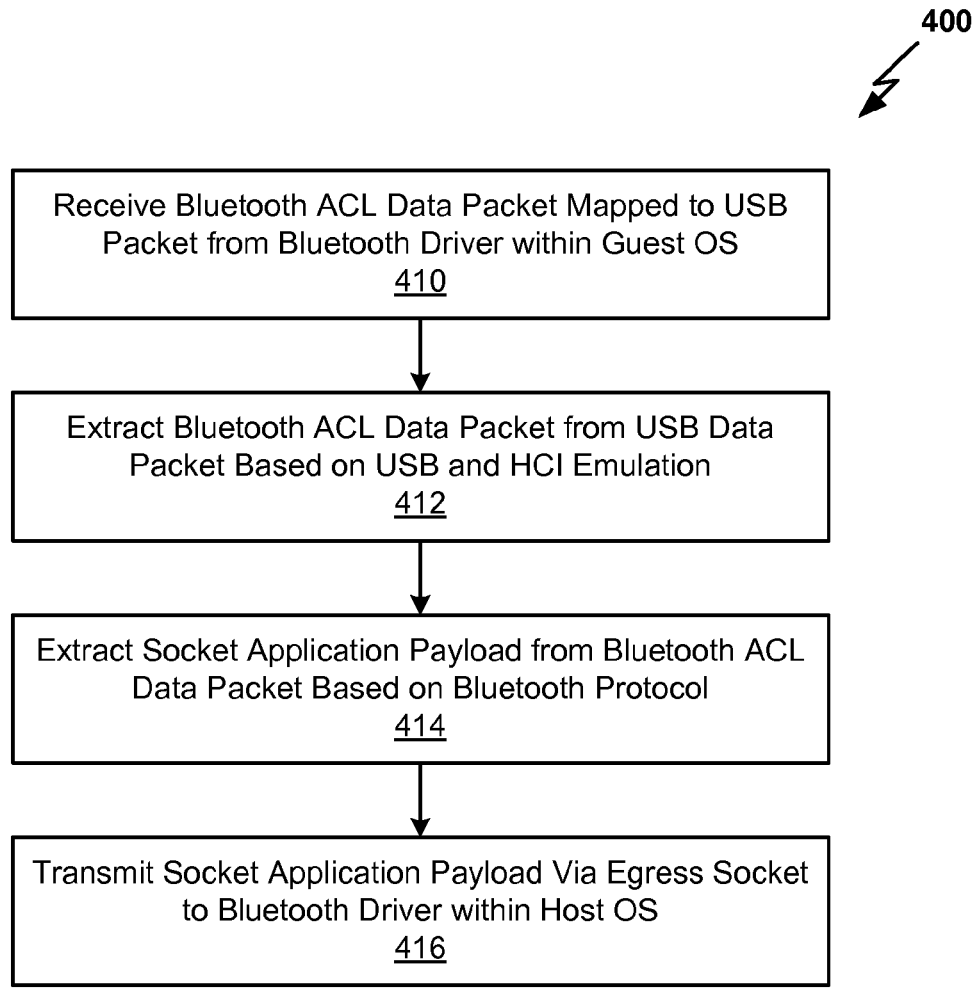
FIG. 4 is a flow diagram of method steps, performed by the Bluetooth virtualization stack, for transmitting data to a Bluetooth device, according to one embodiment of the present invention.

FIG. 4 is a flow diagram of method steps 400, performed by the Bluetooth virtualization stack 164, for transmitting data to a Bluetooth device, such as a Bluetooth device 172, according to one embodiment of the present invention. Although the method steps are described in conjunction with the system of FIGS. 1-2B, it should be understood that there are other systems in which the method steps may be carried out without departing the scope and spirit of the present invention.

The method begins in step 410, where the Bluetooth virtualization stack 164 receives a Bluetooth ACL data packet mapped to a USB packet from the Bluetooth driver 166 within the guest OS 142. In step 412, the Bluetooth virtualization stack 164 extracts the Bluetooth ACL data packet from the USB packet based on USB and HCI emulation. In step 414, the Bluetooth virtualization stack 164 extracts socket application payload from the ACL data packet based on the Bluetooth protocol. In step 416, the Bluetooth virtualization stack 164 transmits the socket application payload via a socket to the Bluetooth driver 162, residing within the host OS 120. The method terminates in step 416.

Figure 5:
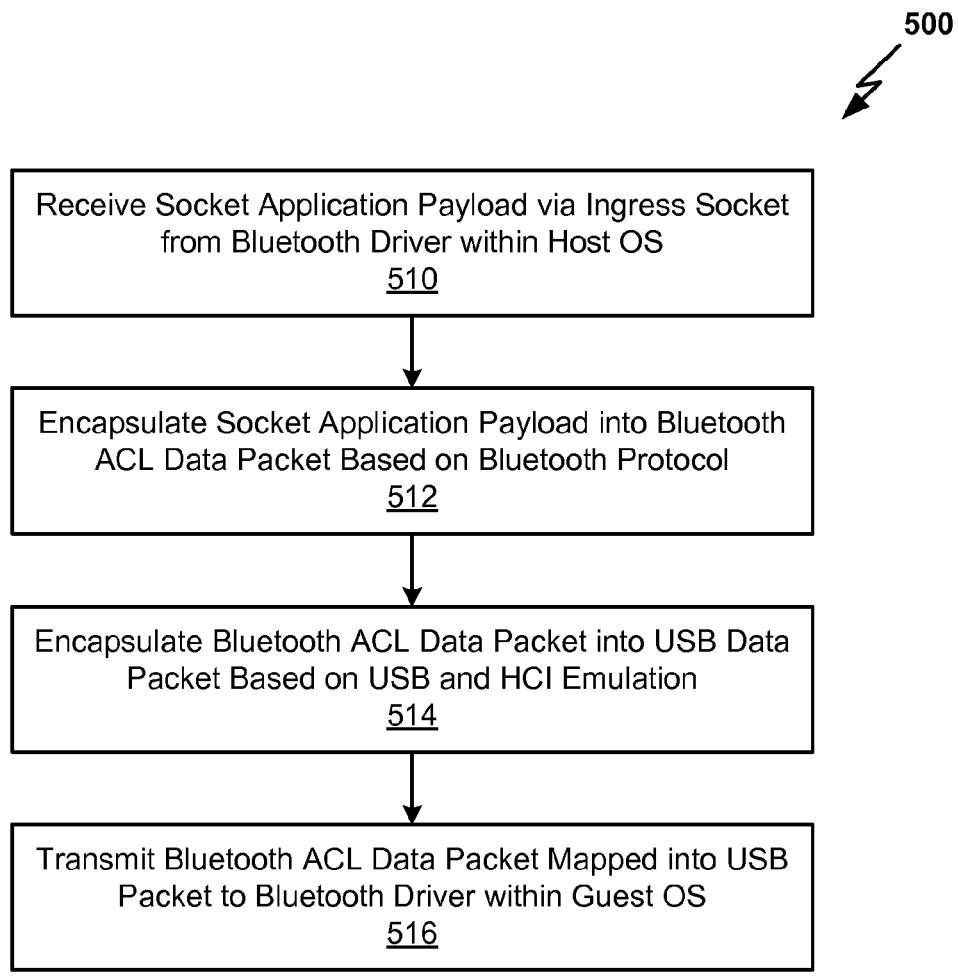
FIG. 5 is a flow diagram of method steps, performed by the Bluetooth virtualization stack, for receiving data from a Bluetooth, according to one embodiment of the present invention.

FIG. 5 is a flow diagram of method steps 500, performed by the Bluetooth virtualization stack 164, for receiving data from a Bluetooth device, such as Bluetooth device 172, according to one embodiment of the present invention. Although the method steps are described in conjunction with the system of FIGS. 1-2B, it should be understood that there are other systems in which the method steps may be carried out without departing the scope and spirit of the present invention.

The method begins in step 510, where the Bluetooth virtualization stack 164 receives socket application payload via an ingress socket from Bluetooth driver 162, residing within host OS 120. In step 512, the Bluetooth virtualization stack 164 encapsulates the socket application payload into a Bluetooth ACL data packet based on Bluetooth protocol. In step 514, the Bluetooth virtualization stack 164 encapsulates the Bluetooth ACL data packet into a USB packet based on USB and HCI emulation requirements. In step 516, the Bluetooth virtualization stack 164 transmits the Bluetooth ACL data packet mapped into a USB packet to the Bluetooth driver 166 within the guest OS 142.

In sum, a technique is disclosed for sharing a physical Bluetooth adapter among plural virtual machines, each having a guest operating system configured to include a guest OS Bluetooth driver. A guest OS Bluetooth driver may apparently establish a data link with different physical Bluetooth devices. However, each data link is parsed by a Bluetooth virtualization stack to extract individual socket streams, which are then transmitted via a host OS Bluetooth driver, which may establish one data link to each physical Bluetooth device in compliance with well-known Bluetooth specifications. In one embodiment, the data link is an ACL link. In alternative embodiments, other data links that are analogous to the ACL link may be used.

C. Additional Embodiments

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention (s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

I claim:

1. A system comprising:
a plurality of guest virtual machines (VMs) executing on a physical computer system having a wireless communication adapter configured therein, each VM implementing a first wireless driver configured to transmit and receive data packets encapsulated in a first format to and from a corresponding wireless virtualization stack;
virtualization software running on the physical computer system that includes the wireless virtualization stacks, each of which corresponds to one of the VMs; and
a second wireless device driver running within a host operating system executing on the physical computer system that is interfaced between each of the wireless virtualization stacks and the wireless communication adapter and is configured to transmit and receive data packets encapsulated in a second format to and from the wireless communication stacks.

2. The system of claim 1, wherein the first wireless driver of each VM implements a wireless protocol stack configured to establish an asynchronous connectionless link for transmitting and receiving data packets encapsulated in the fisrt format to and from the corresponding wireless virtualization stack.

3. The system of claim 2, wherein the wireless protocol stack implemented in each VM is a Bluetooth protocol stack.

4. The system of claim 1,
wherein, the second wireless device driver interfaced between each of the wireless virtualization stacks and the wireless communication adapter is configured to establish a data link between one of the wireless virtualization stacks and a wireless device using the wireless communication adapter.

5. The system of claim 4, wherein each wireless virtualization stack is configured to receive a data packet from the corresponding VM, extract a payload data from the data packet, and transmit the payload data to the second wireless device driver.

6. The system of claim 4, wherein each wireless virtualization stack is configured to receive payload data from the second wireless device driver, bundle the payload data to generate a data packet, and transmit the data packet to the corresponding virtual machine.

7. The system of claim 1, wherein the second wireless communication adapter is configured to transmit and receive data packets encapsulated in the first format with the wireless communication adapter.

8. A method for sharing a wireless communication adapter between virtual machines running on a common host platform, each of the virtual machines implementing a wireless protocol stack configured to establish data links, the method comprising:
   in a first virtual machine, encapsulating a first wireless communication packet into a first data packet as payload data of the first data packet, wherein the first wireless communication packet is in a first format and the first data packet is in a second format;
   in a second virtual machine, encapsulating a second wireless communication packet into a second data packet as payload data of the second data packet, wherein the second wireless communication packet is in the first format and the second data packet is in the second format;
   receiving the first data packet from the first virtual machine and unbundling the payload data from the received first data packet;
   receiving the second data packet from the second virtual machine and unbundling the payload data from the received second data packet; and
   transmitting the payload data unbundled from the received first and second data packets to the wireless communication adapter.

9. The method of claim 8, further comprising:
   receiving unbundled payload data from the wireless communication adapter;
   bundling a first portion of the unbundled payload data to generate data packets and transmitting the data packets to a first virtual machine; and
   bundling a second portion of the unbundled payload data to generate data packets and transmitting the data packets to a second virtual machine.

10. The method of claim 8, wherein the payload data unbundled from the received first and second data packets is transmitted to the wireless communication adapter via a driver executing within an operating system of the common host platform.

11. The method of claim 8, wherein the received first and second data packets comprise universal serial bus (USB) data packets.

12. The method of claim 11, wherein the payload data unbundled from the received first and second data packets comprises asynchronous connectionless link (ACL) data packets.

13. The method of claim 8, further comprising:
   receiving a request to authenticate a connection with a wireless device;
   determining that the wireless device has not been previously authenticated; and
   authenticating the connection with the wireless device via an operating system of the common host platform.

14. The method of claim 13, further comprising:
   authenticating a connection with a virtual wireless device with a proxy link key.

15. The method of claim 11, wherein the payload data unbundled from the received first and second data packets comprises Bluetooth data packets.

16. A non-transitory computer readable storage medium comprising instructions for causing a computer system to carry out a method for sharing a wireless communication adapter between virtual machines running on a common host platform, the method comprising:
   in a first virtual machine, encapsulating a first wireless communication packet into a first data packet as payload data of the first data packet, wherein the first wireless communication packet is in a first format and the first data packet is in a second format;
   in a second virtual machine, encapsulating a second wireless communication packet into a second data packet as payload data of the second data packet, wherein the second wireless communication packet is in the first format and the second data packet is in the second format;
   receiving the first data packet from the first virtual machine and unbundling the payload data from the received first data packet;
   receiving the second data packet from the second virtual machine and unbundling the payload data from the received second data packet; and
   transmitting the payload data unbundled from the received first and second data packets to the wireless communication adapter.

17. The non-transitory computer readable storage medium of claim 16, wherein the received first and second data packets comprise universal serial bus (USB) data packets and the payload data unbundled from the received first and second data packets comprises asynchronous connectionless link (ACL) data packets.

18. The non-transitory computer readable storage medium of claim 16, wherein the method further comprises:
   receiving unbundled payload data from the wireless communication adapter;
   bundling a first portion of the unbundled payload data to generate data packets and transmitting the data packets to a first virtual machine; and
   bundling a second portion of the unbundled payload data to generate data packets and transmitting the data packets to a second virtual machine.

19. The non-transitory computer readable storage medium of claim 16, wherein the method further comprises:
   receiving a request to authenticate a connection with a wireless device;
   determining that the wireless device has not been previously authenticated; and
   authenticating the connection with the wireless device via an operating system of the common host platform.

20. The non-transitory computer readable storage medium of claim 19, wherein the method further comprises:
   authenticating a connection with a virtual wireless device with a proxy link key.

* * * * *